US009144817B2

(12) United States Patent
Guo et al.

(10) Patent No.: US 9,144,817 B2
(45) Date of Patent: Sep. 29, 2015

(54) SYSTEM, METHOD AND APPARATUS TO PREVENT THE FORMATION OF LUBRICANT LINES ON MAGNETIC MEDIA

(75) Inventors: Xing-Cai Guo, Tracy, CA (US); Bruno Marchon, Palo Alto, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 1928 days.

(21) Appl. No.: 12/115,085

(22) Filed: May 5, 2008

(65) Prior Publication Data

US 2009/0274847 A1 Nov. 5, 2009

(51) Int. Cl.
*B05D 1/18* (2006.01)
*B05C 3/00* (2006.01)
*B05C 3/09* (2006.01)
*G11B 5/84* (2006.01)
*B05C 13/02* (2006.01)

(52) U.S. Cl.
CPC ............... *B05C 3/09* (2013.01); *G11B 5/8408* (2013.01); *B05C 13/02* (2013.01)

(58) Field of Classification Search
None
See application file for complete search history.

(56) References Cited

U.S. PATENT DOCUMENTS

| 2,139,553 | A | * | 12/1938 | Little | 8/155.1 |
| 3,075,800 | A |   | 1/1963 | Rowekamp | |
| 4,095,698 | A | * | 6/1978 | Wright | 211/126.1 |
| 4,191,295 | A | * | 3/1980 | Tams, III | 211/41.1 |
| 4,252,430 | A | * | 2/1981 | Michal | 396/622 |
| 4,441,965 | A |   | 4/1984 | Matsumura et al. | |
| 6,340,090 | B1 | * | 1/2002 | Jahani et al. | 211/41.1 |
| 6,520,191 | B1 | * | 2/2003 | Iwamoto et al. | 134/184 |
| 6,596,083 | B2 |   | 7/2003 | Cromwell et al. | |
| 7,052,739 | B2 |   | 5/2006 | Buitron et al. | |
| 2004/0202793 | A1 |   | 10/2004 | Harper et al. | |
| 2004/0226506 | A1 | * | 11/2004 | Lynn | 118/500 |
| 2005/0069668 | A1 |   | 3/2005 | Daodang et al. | |
| 2006/0062957 | A1 |   | 3/2006 | Daodang et al. | |

FOREIGN PATENT DOCUMENTS

| JP | 01134721 | 5/1989 |
| JP | 01162227 | 6/1989 |
| JP | 05028471 | 2/1993 |
| JP | 06150307 | 5/1994 |

* cited by examiner

*Primary Examiner* — Charles Capozzi

(57) ABSTRACT

A system for preventing the accumulation of excess lubrication in the form of lubricant lines on magnetic media disks for hard disk drives uses a mandrel design that produces negligible surface waves when the disks are dipped in lubricant baths. The mandrel has inverted tear drop shaped supports for the disks. The supports are smaller in overall size than an inner diameter hole formed in the disks and diminish the formation of waves in the lubricant bath.

14 Claims, 3 Drawing Sheets

SYSTEM, METHOD AND APPARATUS TO PREVENT THE FORMATION OF LUBRICANT LINES ON MAGNETIC MEDIA

BACKGROUND OF THE INVENTION

1. Technical Field

The present invention relates in general to hard disk drives and, in particular, to an improved system method, and apparatus for preventing the accumulation of excess lubrication in the form of lubricant lines on magnetic media for hard disk drives.

2. Description of the Related Art

Data access and storage systems generally comprise one or more storage devices that store data on magnetic or optical storage media. For example, a magnetic storage device is known as a direct access storage device or a hard disk drive (HDD) and includes one or more disks and a disk controller to manage local operations concerning the disks. The hard disks themselves are usually made of aluminum alloy, glass or a mixture of glass and ceramic, and are covered with a magnetic coating that contains the bit pattern. Typically, one to five disks are stacked vertically on a common spindle that is turned by a disk drive motor at several thousand revolutions per minute. Hard disk drives have several different typical standard sizes or formats, including server, desktop, mobile and micro drive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

As the areal density of magnetic media in hard disk drives increases, the thickness of the lubricant used to coat the media must be decreased to avoid adverse effects on the performance of the disk drives. The thickness of media lubricants has been reduced to such a level (e.g., on the order of 10 Å for some applications) that the uniformity of the lubricant layer is a significant issue.

One particular concern is the formation of wide lubricant "lines" on disks during the lubricant application process. Lubricant lines can be several angstroms thicker than the overall lubricant coating on the disks. The lubricant lines remain on the disks, even after pad burnishing and temperature and/or humidity treatments. These relatively thick lubricant lines are potentially damaging to the flight characteristics of sliders. In addition, lubricant lines cause head smear/lubricant pick-up on the sliders, thereby reducing their durability.

Conventional disk holders produce surface waves in the lubricant bath that cause the lubricant lines to form on the disks. One type of prior art design uses a cover for the bath in an attempt to suppress the magnitude of surface waves. Unfortunately, that design requires precise positioning and careful operation throughout the process, which can cause inadvertent scratches on the disks and give rise to even bigger problems during manufacturing. Although this conventional design is workable, a more effective solution for preventing the formation of lubricant lines on magnetic media would be desirable.

SUMMARY OF THE INVENTION

Embodiments of a system, method, and apparatus for preventing the accumulation of excess lubrication in the form of lubricant lines on magnetic media for hard disk drives are disclosed. The invention provides solutions to problems associated with the prior art by employing a novel mandrel design. The mandrel design produces negligible surface waves in the lubricant bath during the dipping phase of a cassette of magnetic media disks. In one embodiment, the mandrel comprises a plurality of inverted tear drop shaped supports. The supports are smaller in overall size than an inner diameter hole formed in the disks and diminish the formation of waves in the lubricant bath. Compared to prior art solutions, the invention is simple in design, readily implemented, and robust to operate.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1:
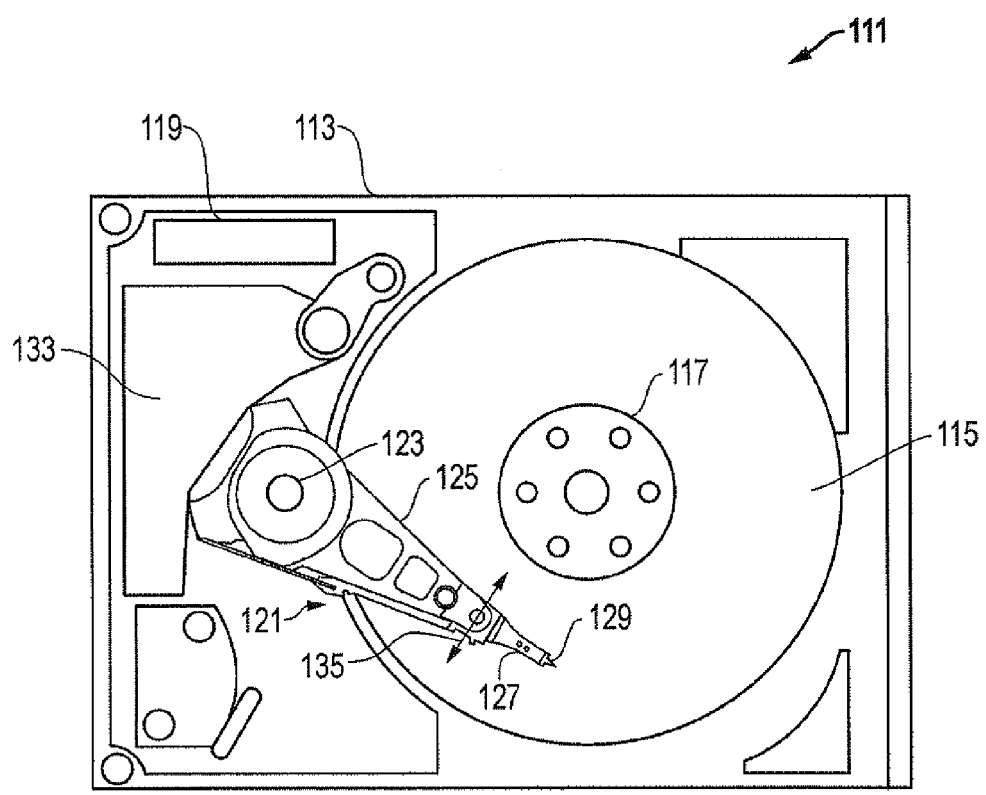
FIG. 1 is a schematic plan view of one embodiment of a disk drive constructed in accordance with the invention.

Referring to FIG. 1, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises one or more parallel actuator arms 125 in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is the head and the slider 129, which are mounted on suspension 127. The slider 129 is usually bonded to the end of suspension 127. The head is typically formed from ceramic or intermetallic materials and is pre-loaded against the surface of disk 115 by suspension 127.

Suspensions 127 have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

Figure 2:
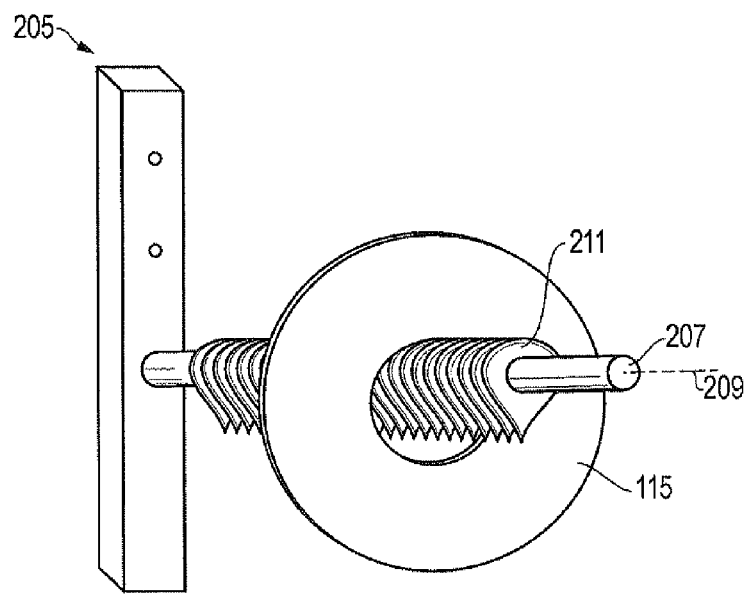
FIG. 2 is an isometric view of one embodiment of a fixture (shown with one media disk) for lubricating media disks for the disk drive of FIG. 1 and is constructed in accordance with the invention.
Figure 2:
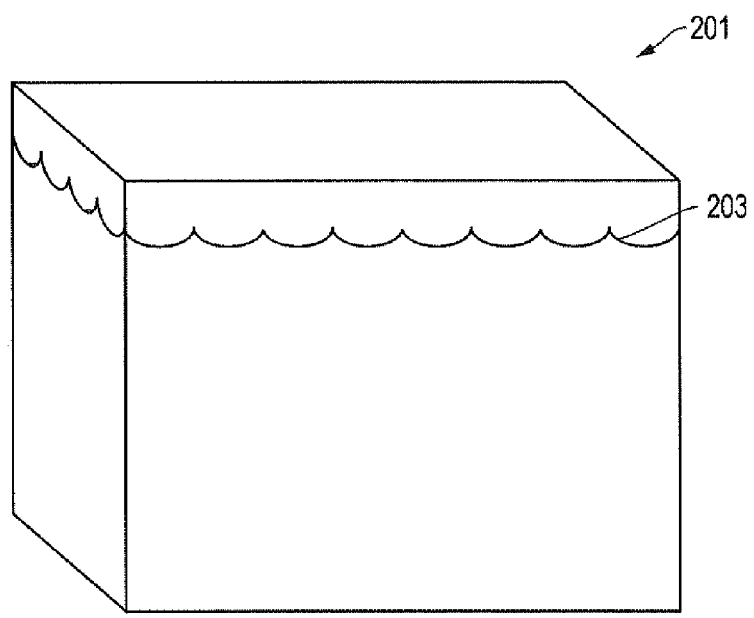
Figure 5:
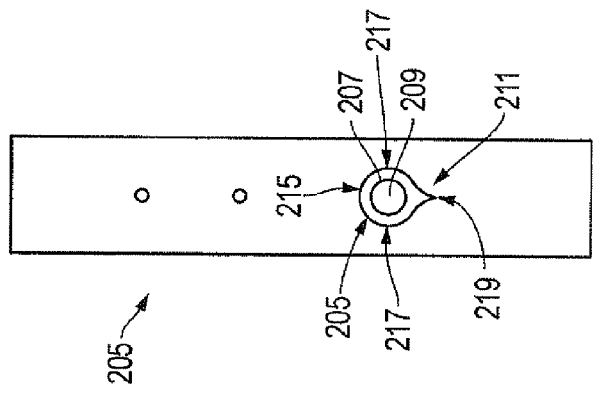
FIG. 5 is an end view of the fixture of FIG. 2 and is constructed in accordance with the invention.

Referring now to FIGS. 2-5, representative embodiments of a system, method, and apparatus for preventing the accumulation of excess lubrication in the form of lubricant lines on magnetic media for disk drives are shown. As depicted in FIG. 2, the system comprises a reservoir or bath 201 containing a volume of solution or lubricant 203 as is known by those having ordinary skill in the art. For example, the lubricant 203 may comprise a low concentration of lubricant and a volatile solvent that evaporates after the lubricant is applied.

One or more media disks 115 (e.g., one shown for simplicity) are located on a fixture 205 adjacent the bath 201. The fixture 205 is used to support and dip the media disk 115 in the volume of lubricant 203 in the bath 201. The fixture 205 has a mandrel 207 with an axis 209. A plurality of partitions or dividers 211 are mounted to the mandrel 207. The dividers 211 axially abut one another (e.g., in a parallel configuration) to define slots 213 therebetween. Alternatively, the dividers 211 may be formed as a single component that mounts to the mandrel 207. Each slot 213 is designed to support one of the media disks 115. Each slot 213 may comprise a circular groove formed between adjacent ones of the dividers 211.

In operation, the disks 115 are retained on the mandrel 207 by the slots 213 between the dividers 211. The disks 115 are lowered and submerged in the lubricant 203 and then removed therefrom at a constant rate. The lubricant is uniformly distributed over the surfaces of the disks 115. During the lube dipping process, the disks are fully immersed beneath the surface of the lubricant solution in a deep bath. The disks are then removed from the bath at a selected rate of speed that controls the thickness of the lubricant that remains on the disks.

It is the unique designs and shapes of the dividers 211 that prevent the lubricant 203 from forming waves in the bath 201. In one embodiment (FIG. 5), each divider 211 has an axial cross-sectional shape that resembles an inverted tear drop.

Figure 3:
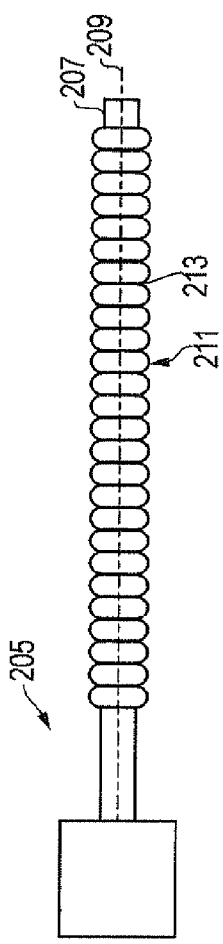
FIG. 3 is a top view of the fixture of FIG. 2 and is constructed in accordance with the invention.
Figure 4:
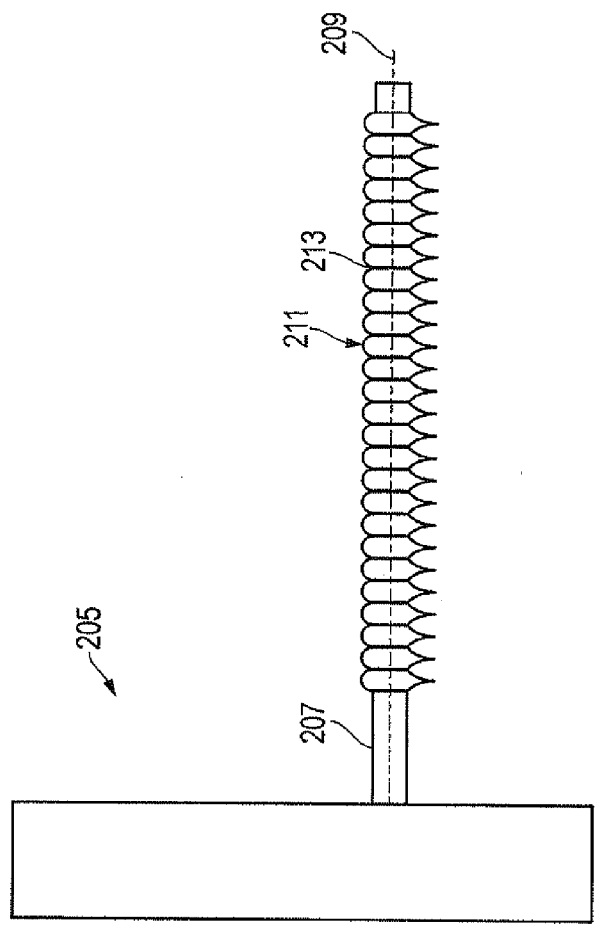
FIG. 4 is a side view of the fixture of FIG. 2 and is constructed in accordance with the invention.

Each divider 211 may be provided with an upper end 215, two side edges 217, and a lower end 219, each of which is axially spaced apart from the upper ends 215, side edges 217 and lower ends 219 of other ones of the dividers 211 as best shown in FIGS. 3 and 4. The upper ends 215 and side edges 217 are generally arcuate or circular in shape, while the lower ends 219 are pointed in shape. The upper ends 215 protrude above the mandrel 207 by an upper distance. The side edges 217 protrude laterally from the mandrel 207 by a side distance that is greater than or equal to the upper distance. The lower ends 219 protrude below the mandrel 207 by a lower distance that is greater than the side distance. Each divider 211 comprises a rounded partition that is curved both axially and radially with respect to the axis 209. Each rounded partition has a lower end 219 that tapers both axially and radially to a point as shown. The same configuration may be used when the dividers are formed as a single component.

In still other embodiments, the shape of the dividers is not limited to inverted tear drop designs. Alternate shapes may be used such as pointed or spiked shapes that significantly diminish or eliminate the agitation of the liquid surface of the lubricant solution when removing the disks from the bath.

The invention also comprises an apparatus for forming a lubricant layer on media disks, as described herein, that may be used to function as a component of the overall system. The invention further comprises a method of lubricating media disks. For example, in one embodiment, the method comprises providing a fixture with a mandrel having an axis and dividers mounted to the mandrel, the dividers axially abutting one another to define slots between the dividers; supporting media disks on the fixture such that each slot supports one of the media disks; placing a volume of lubricant in a bath; lowering the media disks with the fixture to dip the media disks in the volume of lubricant; and lifting the media disks out of the volume of lubricant with the fixture such that the dividers reduce a level of agitation of the a surface of the volume of lubricant.

The method also may comprise providing each divider with an axial cross-sectional shape that resembles an inverted tear drop; or providing each divider with an upper end, two side edges, and a lower end, each of which is axially spaced apart from the upper ends, side edges and lower ends of other ones of the dividers. As shown and described herein, the upper ends and side edges are generally arcuate, and the lower ends are pointed. Alternatively, the upper ends protrude above the mandrel by an upper distance, the side edges protrude laterally from the mandrel by a side distance that is greater than or equal to the upper distance, and the lower ends protrude below the mandrel by a lower distance that is greater than the side distance. The method also may comprise providing each slot as a circular groove formed between adjacent ones of the dividers; or providing each divider as a rounded partition that is curved both axially and radially with respect to the axis, and each rounded partition has a lower end that tapers both axially and radially to a point.

To test the invention, a transparent lubricant draining bath was constructed, and a video microscope was set up for direct observation of the lubricant "dipping" process. Microscopic video footage of the process clearly demonstrated that excess lubricant lines are caused by the surface waves of the liquid lubricant level as it drops suddenly from the bottom edge of the disk holder. Video microscopic observation of the process clearly indicates that a fixture constructed in accordance with the invention diminishes the surface waves in the lubricant bath. Optical surface analyzer imaging of disks demonstrates that the invention effectively prevents the formation of lubricant lines on disks.

While the invention has been shown or described in only some of its forms, it should be apparent to those skilled in the art that it is not so limited, but is susceptible to various changes without departing from the scope of the invention.

What is claimed is:

1. A system for lubricating media disks, comprising:
a bath containing a volume of lubricant;
a plurality of flat media disks, each having an inner diameter hole;
a fixture for supporting and dipping the media disks in the volume of lubricant in the bath, the fixture having a mandrel with an axis;
dividers mounted to the mandrel and defining slots between the dividers for supporting one media disk through a respective inner diameter hole, each divider having an upper end, side edges, and a lower end, and the lower end of each of the dividers is axially spaced apart from the lower end of adjacent ones of the dividers relative to the mandrel axis;
the dividers axially abut adjacent ones of the dividers relative to the mandrel axis; and
the upper end protrudes above the mandrel by an upper distance, the side edges protrude laterally from the mandrel by a side distance that is greater than or equal to the upper distance, the lower end protrudes below the mandrel by a lower distance, and the lower distance is greater than the side distance.

2. A system according to claim 1, wherein, relative to the mandrel axis, each divider has an axial cross-sectional shape that comprises an inverted tear drop to reduce agitation of the lubricant in the bath.

3. A system according to claim 1, wherein, relative to the mandrel axis, the upper end and the side edges of each of the dividers are axially spaced apart from the upper end and the side edges of adjacent ones of the dividers, respectively, such that the media disks are separated from contact with each other.

4. A system according to claim 1, wherein the upper end and the side edges comprise arcuate shapes, and the lower end is pointed.

5. A system according to claim 1, wherein each slot comprises a circular groove formed between adjacent ones of the dividers.

6. A system according to claim 1, wherein each divider comprises a rounded partition that is curved both axially and radially with respect to the axis, the rounded partition tapers into the lower end, and the lower end tapers both axially and radially to a point.

7. A system according to claim 1, wherein the dividers are integrally formed as a single component.

8. An apparatus for forming a lubricant layer on media disks, each having an inner diameter hole, the apparatus comprising:
a fixture for supporting and dipping a plurality of flat media disks in a lubricant, the fixture having a single mandrel with an axis;
dividers mounted to the single mandrel that define slots therebetween, each slot being adapted to support one of the media disks through a respective inner diameter hole and separate the media disks from contact with each other;
each divider has an upper end, two side edges, and a lower end, each of which is, relative to the mandrel axis, axially spaced apart from the upper end, the side edges and the lower end, respectively, of other ones of the dividers;
the dividers axially abut adjacent ones of the dividers relative to the mandrel axis; and
the upper end protrudes above the single mandrel by an upper distance, the side edges protrude laterally from the single mandrel by a side distance that is greater than or equal to the upper distance, the lower end protrudes below the single mandrel by a lower distance, and the lower distance is greater than the side distance.

9. An apparatus according to claim 8, wherein, relative to the mandrel axis, each divider has an axial cross-sectional shape comprising an inverted tear drop to reduce agitation of the lubricant in a bath.

10. An apparatus according to claim 8, wherein the upper end and the side edges comprise circular shapes, and the lower ends are is pointed.

11. An apparatus according to claim 8, wherein each slot comprises a circular groove formed between adjacent ones of the dividers.

12. An apparatus according to claim 8, wherein each divider comprises a rounded partition that is curved both axially and radially with respect to the axis, the rounded partition tapers into the lower end of each divider, and the lower end tapers both axially and radially to a point.

13. An apparatus according to claim 8, wherein the dividers are integrally formed as a single component.

14. A system for lubricating media disks, comprising:
a bath containing a volume of lubricant;
a plurality of flat media disks, each having an inner diameter hole;
a fixture for supporting and dipping the media disks in the volume of lubricant in the bath, the fixture having a mandrel with an axis for supporting one media disk through a respective inner diameter hole;
dividers mounted to the mandrel and defining slots between the dividers for supporting the media disks through their inner diameter holes, each divider having an upper end, side edges, and a lower end, the lower end of each of the dividers is axially spaced apart from the lower end of adjacent ones of the dividers relative to the mandrel axis;
each divider has an axial cross-sectional shape, relative to the mandrel axis, that comprises an inverted tear drop to reduce agitation of the lubricant in the bath, such that the upper end and the side edges comprise arcuate shapes that are curved both axially and radially with respect to the mandrel axis, the arcuate shapes taper into the lower end, and the lower end of each of the dividers tapers both axially and radially to a point;
the dividers axially abut adjacent ones of the dividers relative to the mandrel axis; and
the upper end protrudes above the mandrel by an upper distance, the side edges protrude laterally from the mandrel by a side distance that is greater than or equal to the upper distance, the lower end protrudes below the mandrel by a lower distance, and the lower distance is greater than the side distance.

* * * * *